UNITED STATES PATENT OFFICE.

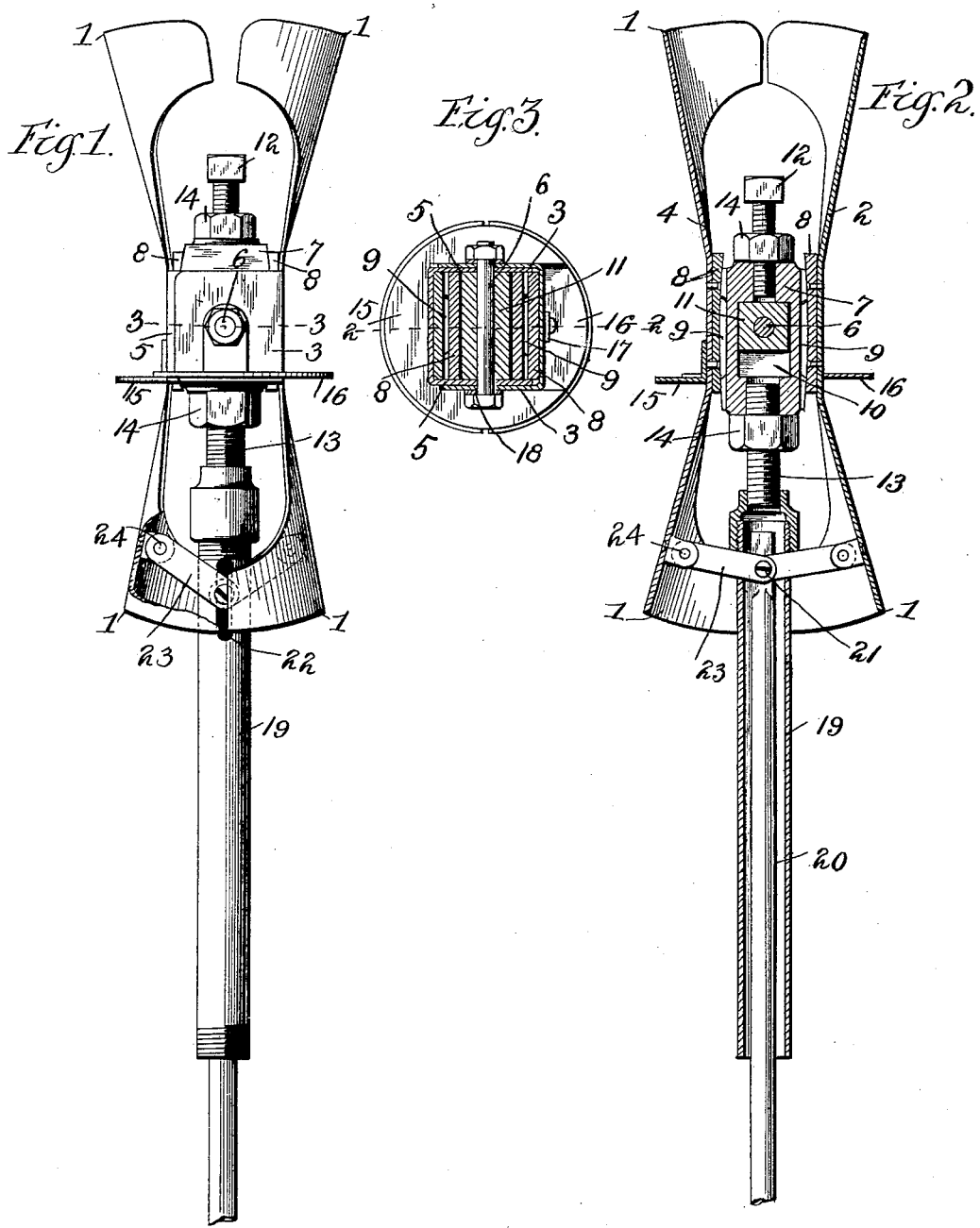

LEE V. TUCKER, OF CHICAGO, ILLINOIS.

FLUE-SCRAPER.

SPECIFICATION forming part of Letters Patent No. 655,313, dated August 7, 1900.

Application filed August 23, 1897. Serial No. 649,203. (No model.)

*To all whom it may concern:*

Be it known that I, LEE V. TUCKER, a citizen of the United States, residing at Chicago, in the county of Cook and State of Illinois, have invented certain new and useful Improvements in Flue-Scrapers, of which the following is a full, clear, and exact specification.

My invention relates to the devices for scraping the interior of boiler tubes or flues or other like passages for removing the scale, rust, and other objectionable particles of foreign matter adhering thereto.

My invention has for one of its objects to provide an improved flue-scraper which shall be so constructed that the scraping-blades may be contracted at will for passing a seam or weld or other like obstruction in the flue when operating in either direction.

Another object of my invention is to provide means whereby the blades or scrapers may be fixed so as to be used as a chisel.

My invention has for a further object to provide improved means for automatically expanding or spreading and contracting the scrapers at opposite ends by the pressure or power applied for forcing the device through the tube.

With these ends in view my invention consists in certain features of novelty in the construction, combination, and arrangement of parts by which the said objects and certain other objects hereinafter appearing are attained and as fully described with reference to the accompanying drawings and more particularly pointed out in the claims.

In the said drawings, Figure 1 is a plan view of my improved flue-scraper partly broken away for illustrating the internal parts and showing the blades or scrapers at the forward end expanded or spread. Fig. 2 is a vertical longitudinal section thereof, taken on the line 2 2, Fig. 1, showing the blades or scrapers at the forward end contracted; and Fig. 3 is a transverse sectional view taken on the line 3 3, Fig. 1.

In carrying out my invention I employ two scraping-blades, each of which is provided at each end with a sharpened edge 1, each curved transversely approximately on the arc of a circle, so that the contiguous ends of the two blades or the two edges 1 when spread apart will approximately fit the interior of the tube. This circular formation, however, is of course incidental to the form of the tube to be cleaned, and hence the transverse curvature or outline of the edges 1 will be governed by the transverse outline of the tube. Each of the blades is flared upwardly and outwardly from its mid-length, and the blade 2 is provided on each side with an upturned ear or flange 3, while the upper blade 4 is provided on each side with a downturned flange or ear 5, the two latter fitting between the ears 3 and a pivot bolt or pin 6 passing through them all, so as to pivot the blades 2 4 together at their mid-length.

Arranged between the blades 2 4 at their mid-length is a double-ended wedge 7, which is tapered from its mid-length toward each end and which when moved back and forth with reference to the blades causes them to alternately open and close at opposite ends. In order to provide for the smooth and easy action of the parts, the surface of the wedge 7 is more or less rounded, as indicated in Fig. 2, while each of the blades 2 4 is provided with a more or less rounded bearing-plate 8, whose extremities are curved inwardly toward the wedge 7, so that the wedge in approaching either end of the plates 8 will cause the blades to spread apart at that end. The curved surfaces of the wedge 7 are also provided with longitudinal and transverse passages or channels 9, which are for the purpose of permitting soot and dirt to escape and avoid clogging up the mechanism.

In order that the wedge 7 may go and come with reference to the pivot-bolt 6, I provide the wedge with a slot 10, and I preferably pass the bolt 6 through a block 11, which accurately fits in the slot 10 and permits of the easy reciprocal movement of the wedge 7 thereover. The block 11 also serves as an abutment for a set-screw 12, threaded in a perforation in one end of the wedge 7 and being adapted to be screwed in against the block 11 for holding the pivotal point or bolt 6 at the desired adjustment with relation to the wedge 7. Thus it will be seen that should the screw 12 be forced inwardly, pushing the block 11 to the left-hand end of the slot 10, the blades at the forward end of the device would be forced apart and rigidly held in this position, permitting the device to be utilized as a chisel where great power is required for removing hard substances from the interior of the tube. The blades 2 4 being flexible, however, the device may be readily removed from the tube without obstruction. In the other end of the wedge 7 is threaded a screw 13, which is also adapted to be screwed into the slot 10, and thereby force the block 11 to the opposite end of the slot and in doing so make a relative movement of the wedge 7 and blades 2 4 in the opposite direction, and consequently throw the blades together at the right-hand end and force them apart at the left-hand end, thereby rigidly locking the blades while being used as a chisel in working in the opposite direction. Each of the screws 12 13 is provided with a jam-nut 14, whereby they may be firmly locked in their set position.

Secured around the narrower portion of the blades 2 4 and substantially at their mid-length is a circular scoop, which is slightly smaller in diameter than the maximum diameter of the opened blades or scrapers. This scoop is composed of two parts 15 16, the latter being secured by the flange 17 to the lower blade 2 and the former by ears or flanges 18 to the pivot-bolt 6. The portion 15 extends around three sides of the device, as shown in Fig. 3, while the portion 18 is a small section fitted in between the edges of the portion 15 and filling out the fourth side of the circle. This arrangement is resorted to for the purpose of permitting the blades 2 4 to oscillate without interference from the scoop 15 16. The purpose of the scoop 15 16 is to catch the deposit as it is dislodged by the scrapers and convey the same out of the tube.

In order that the scraping-blades at each end may be contracted when the device is in the tube and it is desired to pass a seam or weld, I provide means for reciprocating the wedge 7 with reference to the blades 2 4 from a point outside of the flue. A simple construction for accomplishing this consists of a hollow stem 19, secured in any suitable way to one end of the set-screw 13, which thereby connects it with the wedge 7, and located in this stem 19 is a smaller stem 20, to which is secured a pin or lug 21, passing through a slot 22 in the stem 19 and constituting the pivot of a pair of toggle-arms 23, whose outer ends are detachably secured at 24 to the blades 2 4, respectively. Thus it will be seen that should the device be forced into the tube by means of the stem 19, the stem 20 being allowed to remain in its present position, the resistance of the blades 2 4 against the tube would retard them sufficiently to cause the wedge 7 to move forward with relation to the blades, and consequently throw the blades apart at their forward or right-hand end, and when the stem 19 is pulled on for removing the scraper from the tube the wedge will make an opposite movement, closing the blades at the right-hand end and throwing them apart at the left-hand end. Should a weld or seam be encountered in the tube while moving the device toward the right, for instance, the stem 20 would be forced inwardly and the stem 19, if necessary, given a relative outward movement. This of course would cause the blades at their forward ends to close and at their rear ends to open, thus permitting the forward ends of the blades to pass the weld or seam, and after having passed it they may be spread apart again by simply pushing upon the stem 19. Should the device encounter a weld or seam when moving in the opposite direction or toward the left, the stem 20 would be pulled outwardly, as shown in Fig. 1, to cause the blades at the left-hand end of the device to contract. After the seam is passed the blades at the left-hand end may be again thrown into operative position by pushing inwardly on the stem 20 and pulling outwardly upon the stem 19.

Having thus described my invention, what I claim as new therein, and desire to secure by Letters Patent, is—

1. A flue-scraper having in combination double-ended scrapers pivotally connected at their mid-length, a wedge arranged between connected with and having movement with relation to said scrapers, for forcing their ends apart, a stem secured to said wedge, and a stem having lever connection with said scrapers for contracting or expanding them at will, substantially as set forth.

2. A flue-scraper having in combination expansible scrapers, a wedge arranged between said scrapers and having a slot, a block arranged in said slot and having operative connection with said scrapers, and a set-screw threaded in said wedge and adapted to impinge said block for adjusting the latter, substantially as set forth.

3. A flue-scraper having in combination two scraping-blades having an edge at each end and being pivoted together about their mid-length, a stem operatively connected to one end of each blade, a wedge arranged between said blades and being movable with relation thereto and a second stem connected to said wedge, substantially as set forth.

4. A flue-scraper having in combination two blades pivoted together at their mid-length and each having an edge at each end, the curved plates 8 secured to said blades, respectively, a double-ended wedge arranged between said plates and having a slot through which the pivot of said blades passes, a hollow stem connected to said wedge, a second stem arranged within said hollow stem and a pair of toggle-arms pivoted to said second stem and to said blades, substantially as set forth.

LEE V. TUCKER.

Witnesses:
L. K. WHITE,
N. B. McCREARY.